US012734581B2

(12) United States Patent
Mullens et al.

(10) Patent No.: US 12,734,581 B2
(45) Date of Patent: Sep. 15, 2026

(54) PASTE COMPOSITION FOR ADDITIVE MANUFACTURING

(71) Applicant: VITO NV, Mol (BE)

(72) Inventors: Steven Mullens, Mol (BE); Ivo Thijs, Mol (BE); Bart Michielsen, Mol (BE); Marleen Rombouts, Mol (BE); Jo Verwimp, Mol (BE); Marijn Gysen, Mol (BE); Jasper Lefevere, Mol (BE)

(73) Assignee: VITO NV, Mol (BE)

( * ) Notice: Subject to any disclaimer, the term of this patent is extended or adjusted under 35 U.S.C. 154(b) by 790 days.

(21) Appl. No.: 17/624,926

(22) PCT Filed: Jul. 20, 2020

(86) PCT No.: PCT/EP2020/070490

§ 371 (c)(1),
(2) Date: Jan. 5, 2022

(87) PCT Pub. No.: WO2021/013812

PCT Pub. Date: Jan. 28, 2021

(65) Prior Publication Data

US 2022/0266337 A1 Aug. 25, 2022

(30) Foreign Application Priority Data

Jul. 19, 2019 (EP) .................................... 19187433

(51) Int. Cl.

| | |
|---|---|
| ***B22F 10/18*** | (2021.01) |
| ***B22F 1/10*** | (2022.01) |
| ***B33Y 10/00*** | (2015.01) |
| ***B33Y 50/02*** | (2015.01) |
| ***B33Y 70/00*** | (2020.01) |
| ***C04B 35/111*** | (2006.01) |
| ***C04B 35/622*** | (2006.01) |
| *B22F 12/53* | (2021.01) |

(52) U.S. Cl.

CPC ................ *B22F 10/18* (2021.01); *B22F 1/10* (2022.01); *B33Y 10/00* (2014.12); *B33Y 50/02* (2014.12); *B33Y 70/00* (2014.12); *C04B 35/111* (2013.01); *C04B 35/62236* (2013.01); *B22F 12/53* (2021.01); *C04B 2235/5252* (2013.01); *C04B 2235/6021* (2013.01); *C04B 2235/6026* (2013.01)

(58) Field of Classification Search

CPC . B22F 10/18; B22F 1/10; B22F 12/53; B33Y 10/00; B33Y 50/02; B33Y 70/00; B33Y 80/00; C04B 2235/6021; C04B 35/62227; C04B 35/63444; C04B 35/63488; C04B 35/63492; C04B 35/6365

See application file for complete search history.

(56) References Cited

U.S. PATENT DOCUMENTS

| | | | | |
|---|---|---|---|---|
| 2014/0352778 | A1* | 12/2014 | Yang | H01L 31/1884 252/514 |
| 2016/0347667 | A1 | 12/2016 | Nordahl | |
| 2018/0111881 | A1* | 4/2018 | Schubert | C04B 35/638 |
| 2018/0291199 | A1 | 10/2018 | Miyake | |
| 2019/0001410 | A1 | 1/2019 | Ho et al. | |
| 2021/0238099 | A1* | 8/2021 | Canales Vázquez | C04B 35/62277 |
| 2022/0235194 | A1* | 7/2022 | Peled | B22F 10/50 |

FOREIGN PATENT DOCUMENTS

| | | | | |
|---|---|---|---|---|
| EP | 3398921 | A1 | 7/2018 | |
| EP | 3385244 | A1 * | 10/2018 | C04B 35/01 |
| FR | 3024658 | A1 * | 2/2016 | A61K 8/0229 |
| JP | 2010-537679 | A | 12/2010 | |
| JP | 2017-110153 | A | 6/2017 | |
| WO | WO2017/191340 | A1 | 9/2017 | |
| WO | 2018059341 | A1 | 4/2018 | |
| WO | 2018103529 | A1 | 6/2018 | |
| WO | 2019133255 | A1 | 7/2019 | |
| WO | WO-2021013812 | A1 * | 1/2021 | |

OTHER PUBLICATIONS

Ian Gibson, David Rosen, Brent Stucker, Additive Manufacturing Technologies, 2015, Spring, Second Edition, pp. 147-173 (Year: 2015).*
Translation to FR 3024658-A, Feb. 12, 2016, Jaunet Clement.*
ISR and Written Opinion in corresponding PCT Application No. PCT/EP2020/070490, dated Oct. 27, 2020.
First OA cited in corresponding India Patent Appln. No. 202217003897 dated Nov. 30, 2023, with English Translation.
First OA dated May 28, 2024 cited in corresponding Japanese Patent Appln. No. 2022-503572 with translation.
Second Office Action dated Nov. 26, 2024 cited in corresponding Japanese Patent Appln. No. 2022-503572 with translation.

* cited by examiner

*Primary Examiner* — Jonathan Johnson
(74) *Attorney, Agent, or Firm* — BACON&THOMAS, PLLC

(57) ABSTRACT

An additive manufacturing paste composition for manufacturing a three-dimensional shaped article of a material of interest, said paste composition including 70-99.8 wt. % with respect to the weight of the composition of particles of the material of interest, the material of interest being one or more compounds selected from the group of metals and metal alloys and mixtures thereof, at least one binder component, at least one additive component, which is a lubricant, one or more solvents which are miscible with each other, wherein the sum of the concentration of the at least one additive component and the at least one binder is between 0.06 wt. % and 10.0 wt. %, with respect to the weight of the paste composition, and wherein at least one of the additive component and the binder component or the mixture thereof are shear-thinning.

18 Claims, 6 Drawing Sheets

PASTE COMPOSITION FOR ADDITIVE MANUFACTURING

FIELD OF THE INVENTION

The present invention relates to a paste composition for use in additive manufacturing of a three-dimensional object of a material of interest, in particular a metal or a metal alloy or mixtures thereof. The invention also relates to a method for the additive manufacturing of a three-dimensional object using such a paste composition, and to a three-dimensional object obtained by additive manufacturing of the paste composition.

BACKGROUND OF THE INVENTION

Additive manufacturing, in particular robocasting, is a technique which is well known in the art. Starting typically from a CAD model of a desired object, in robocasting a viscous paste is formed into continuous filaments which are deposited, layer by layer, on a positioning stage or platform according to a predetermined pattern. The process ultimately results in the object with the desired shape.

A robocasting system typically comprises a material depositing device having one or more nozzles and/or nozzle arrays. A paste composition containing the material of interest is controllably dispensed or extruded through the one or more nozzle, in the form of a continuous filament. The robocasting system further comprises a positioning stage onto which consecutive layers of the filament are deposited and the three dimensional object is printed. The positioning stage may be a table which may be moveable in the X-Y plane. The dispensing device may be driven by conventional means in one or more of the X, Y and Z-direction, but of course several ways of moving the platform and the depositing device with respect to each other are possible.

When in use, the paste composition is supplied from a reservoir to the one or more nozzles and expelled therefrom in the form of a filament. Because the paste composition has shear-thinning properties, dispensing from the nozzle is facilitated, while flowing of the filaments after deposition remains be limited. As a result, the paste composition retains its shape after having been expelled from the nozzle. Nozzles with a larger opening will generally give rise to the formation of filaments with a larger cross section, and in a three-dimensional object the layers may be visually distinguished from each other, while the surface of the object will usually show a certain relieve which originates from the filaments. Nozzles with a smaller nozzle opening on the other hand will generally give rise to the deposition of filaments with a smaller cross section and may permit producing an object with a smoother surface. Depending on the size of the three-dimensional object to be produced, nozzles with a smaller nozzle opening may require a longer processing time.

A three-dimensional shaped article may typically be obtained by a method which includes depositing interconnected filaments in a predetermined arrangement in a plurality of stacked layers. Each layer contains a plurality of adjacent filaments or filament parts, the distance between consecutive filaments or filament parts within one layer and within subsequent layers being the same or different. Filaments of consecutive layers are connected to one another at least at the position where consecutive layers contact each other, and thereby form the shaped article. Filaments of consecutive layers may be positioned under an angle with respect to each other.

After the desired number of layers of filaments has been deposited according to the desired pattern, a three-dimensional structure, the so-called "green body", is obtained which often is quite fragile and soft. Typically, a drying process follows the deposition or dispensing step with the purpose of evaporating solvent from the green body. This step may be followed by a calcination step to burn off and/or decompose at least part of the organic components present in the paste composition. A sintering or firing step may also be provided for, with the purpose of strengthening and/or compacting the three-dimensional structure and/or fusing the particles of the material of interest to obtain a three-dimensional shaped article with desired mechanical properties.

The three-dimensional article may be a substantially dense solid object, it may be a hollow structure, or a filament may be formed into several parallel filaments within one layer deposited at a distance from each other in such a way that holes and channels are formed between the filaments and a porous structure is obtained comprising voids or pores between the filaments. In consecutive layers, filaments may be positioned at an angle with respect to each other. The paste composition may be deposited on a printing platform or printing surface as such, without requiring the use of a supporting structure for supporting the deposited paste. Where needed, for example in the case of overhanging parts, the use of a supporting structure may be envisaged. The paste composition generally comprises the material of which the final object is to be composed (also called the material of interest). The material of interest is typically incorporated in the paste composition in the form of particles. The paste composition will usually further contain a binder component for binding the particles of the material of interest at least during filament deposition.

Ideally, a paste composition is used that allows a rapid dispensing, extrusion or flow of material through the nozzle of the device as well as a reproducible deposition when the extruded material strikes the positioning stage. When subsequent or multiple layers are applied, it is often desirable that adjacent layers are capable of flowing together to a certain extent in order to form a unitary structure, with consecutive layers connected to each other to a certain extent. Although some material flow may be desired, it should be limited to such an extent that it does not distort the desired shape of the printed structure or "green body".

When moving through the nozzle during dispensing, the paste composition will experience high shear conditions. In order to facilitate filament deposition in the intended shape, a paste composition will often be used with a pseudo-plastic rheology, so that the paste composition can flow smoothly through the nozzle during dispensing and a fast solidification takes place upon deposition once shear stresses are removed. If upon deposition the paste is too fluid, there is a risk that the extruded filament of paste material will spread uncontrollably. If on the other hand the paste composition is too viscous upon deposition, a layer or filament of paste material may look like a string of rope with rounded tops and flowing together of consecutive layers needed to obtain a unitary structure may remain limited. Therefore, under a shear stress, the paste formulation ideally exhibits sufficient shear thinning to allow the paste to flow through small diameter nozzles without requiring prohibitively high driving pressures.

There is a need for a paste composition for use in the additive manufacturing, in particular in robocasting, which has a high solids content to permit manufacturing of articles with a high density and high mechanical strength. Besides this, there is a need for a paste composition which shows desired rheological behaviour in view of the additive manufacturing technique involved, i.e. dispensing or deposition of the paste through a nozzle, and which permits reducing the failure rate to an absolute minimum.

One aim of the present invention is therefore to provide a paste composition containing particles of a material of interest, for use in additive manufacturing in particular for use in robocasting of said material of interest into a three-dimensional shaped article with a desired shape. Another aim of the invention is to maximise the solids content of the paste composition without adversely affecting the quality of the printed object.

SUMMARY OF THE INVENTION

The present invention therefore seeks to provide a paste composition containing particles of a material of interest, for use in additive manufacturing in particular for use in robocasting of said material of interest into a three-dimensional shaped article with a desired shape. The present invention further seeks to maximise the solids content of the paste composition.

This is achieved according to the present invention with an additive manufacturing paste composition for manufacturing a shaped article of a material of interest.

Thereto, the additive manufacturing paste composition for manufacturing a three-dimensional shaped article of a material of interest, said paste composition comprising

- 70-99.8 wt. % with respect to the weight of the composition of particles of the material of interest, the material of interest being one or more compounds selected from the group of metals and metal alloys and mixtures thereof,
- at least one binder component,
- at least one additive component, which is a lubricant,
- one or more solvents which are miscible with each other, wherein the sum of the concentration of the at least one additive component and the at least one binder is between 0.06 wt. % and 10.0 wt. %, with respect to the weight of the composition, and wherein at least one of the additive component and the binder component or the mixture thereof are shear-thinning.

With the wording that the one or more solvents are miscible with each other is meant that the one or more solvents mix in all proportions used in the composition of this invention so as to form a homogeneous phase.

In a preferred embodiment, the remainder up to 100 wt. % is made up by the one or more solvents and the conventional additional ingredients present in the paste composition.

According to a preferred embodiment, said at least one additive component may be soluble in the solvent, in particular the additive component may a solvent soluble wax, fat or oil or a mixture of two or more hereof, and the at least one of the additive component and the binder component or the mixture thereof, is shear-thinning. According to another preferred embodiment the at least one additive component may be a solvent-dispersible wax, a solvent-dispersible fat or a solvent-dispersible oil or a mixture of two or more hereof, and wherein at least one of the additive component and the binder component or the mixture thereof, is shear-thinning.

Realising a high solids content is important as it permits manufacturing filaments and 3D printed articles made of a high density material, and high mechanical strength which may be desired for certain applications. Realising a high solids content permits manufacturing filaments and 3D printed articles with a limited content of organic material. Reducing the amount of organic material in the paste composition is important as organic material remaining after calcination and/or sintering may adversely affect the mechanical properties and mechanical strength of the 3D printed article. Carbon based impurities may cause brittleness of the material containing it after it has been subjected to sintering, in particular when the material is a metal or a metal alloy. Carbon based impurities may thus adversely affect the mechanical properties, in particular the mechanical strength, and may cause the density of the end product to be lower than initially intended. Moreover, carbon may be incorporated or build into the material of interest, in particular if the material of interest contains metals and/or metal alloys and cause deterioration of the mechanical properties. For some applications, having an article with a purity that is as high as possible may be required.

Reducing the amount of organic material in the paste composition permits reducing the risk to filament shrinkage as well as shrinking of the 3D printed article during drying and calcination. Filament shrinkage may induce crack formation, and lead to rejection of the 3D printed article.

The paste composition of this invention may be produced as a homogeneous paste, which shows a minimum risk to phase separation of the fluid phase (which comprises at least the solvent), and the solid phase, even with the high content of the particles of the material of interest. Preventing phase separation may be important during paste preparation and storage, but is of utmost importance upon dispensing.

The inventors have observed that with the paste composition of this invention, the risk to phase separation remains minimal also in the course of the extrusion process, where the paste composition is displaced from a reservoir towards and through a nozzle under pressure, formed into one or more filaments of a desired cross section and length and expelled from the nozzle onto a printing table. This is surprising as pressures used in the filament formation often approach values which cause phase separation. Usually, the nozzle has a cross section that is substantially smaller than the cross section of the paste feed. This advantageous effect has surprisingly been observed with the paste composition of this invention wherein the material of interest is made up of metal particles and/or metal alloy particles, which otherwise easily give rise to phase separation, in particular when the content of such particles raises to 70.0-99.8 wt. % with respect to the weight of the paste composition. As a result paste compositions are provided which hitherto were not suitable to be processed in a 3D printing process which makes use of a paste extrusion process, at least not at the high concentrations of the material of interest as envisaged by the present invention.

Preventing phase separation is important, as it permits achieving a desired homogeneity in the composition over the cross section and length of the formed filaments. Such filaments may have a more homogeneous density, porosity, mechanical strength and other mechanical properties over the length and cross-section of the filaments. A shaped article produced by deposition of a plurality of stacked layers of interconnected filaments of the paste composition of this invention in a predetermined arrangement, may have a substantially homogeneous composition in each of the stacked layers and throughout the entire article. Such a shaped article may have a more homogeneous density, porosity, mechanical strength and other mechanical properties.

Preventing phase separation is further important in view of preventing remainders of material to remain behind during displacement of the paste composition through the nozzle, which may cause nozzle clogging, the formation of defects in the filaments and hence rejection of an article formed therefrom.

Although the force needed to achieve extrusion of the paste from a nozzle may be different for different materials, it has been found that when using the paste composition of this invention, once the conditions have been set for a certain paste composition, adjusting of these conditions may not be needed in the course of the extrusion process. In particular once the pressure to be exerted to the paste composition to produce filaments of a desired cross section and/or length has been set, adjusting thereof may not be needed in the course of the extrusion process. Thus, the pressure to be exerted to the paste composition may be kept substantially constant throughout the entire extrusion process and may require adaptation to a minimal extent only. Also other conditions such as the temperature of the paste composition may require adaptation to a minimal extent only. This is an advantage as it permits minimising the risk to variations occurring in the filaments produced in the extrusion step, for example variations in composition and/or density. These variations may give rise to varying mechanical properties, e.g. a varying mechanical strength in a filament and as a consequence in the 3D printed article incorporating such a filament. Keeping the conditions in the course of extrusion of the paste composition constant is further important as it permits reducing the risk to the occurrence of phase separation.

The present invention therefore provides a paste composition which shows a high cohesive strength, even when subjected to pressure and to shear forces.

The binder and the material of interest contribute to controlling the viscosity of the paste composition of this invention so that the paste composition can take the form of a viscous paste with a desired viscosity suitable for use in robocasting as described above. The paste composition of this invention is suitable for being fed from a container, through any tubing involved, towards an extrusion device if needed and further towards and through a nozzle which usually has a small cross section when compared to the cross section of the paste composition feed. Since at least one of the at least one binder component and the at least one additive component are shear thinning, the viscosity of the paste composition will decrease to a certain extent when the paste composition is subjected to shear forces. Because of the shear thinning properties, the viscosity can be reduced to such an extent that extrusion through a nozzle can be achieved, and the paste composition is formed into a filament of a desired cross section and length. As a result of the shear thinning properties, the pressure needed to achieve extrusion may be reduced, thereby minimising the risk to the occurrence of phase separation in the paste. The viscosity has been found to restore at least partly upon removal of the shear forces. Restoration of the viscosity appears to be almost instantaneous, although some variation may occur for different materials. As a result, some flowing of the paste composition in a filament may take place after the filament has been dispensed from the nozzle. This will improve adhesion of consecutive filaments and/or of filaments in consecutive layers which contact each other. According to a further embodiment, although some flowing may be desired, flowing of the paste composition should be limited in order to not deviate too much from a desired shape of the filaments and the 3D article to be produced.

The present invention also relates to the use of a solvent-dispersible or solvent-soluble wax, fat or oil or a mixture of two or more hereof in a paste composition for additive manufacturing in particular robocasting, where the paste composition is displaced through a nozzle with a reduced diameter, and expelled from the nozzle in the form of a continuous filament with a long length, by subjecting the paste composition to a pressure. The present invention in particular relates to the use of a water-soluble or water-dispersible wax, fat and/or oil in the paste composition of this invention for additive manufacturing, in particular robocasting. Thereby, as is described below, it is preferred that the water-dispersible wax comprises lanolin. Small amounts of the additive suffice to facilitate displacement of the paste composition through the nozzle and the nozzle opening, and counteract clogging of the nozzle.

The present invention also relates to a method for producing a three-dimensional shaped article of a material of interest using additive manufacturing, the method including feeding to a nozzle and dispensing from said nozzle on a print surface, interconnected filaments of an additive manufacturing viscous paste composition in a predetermined arrangement in a plurality of consecutive stacked layers to form a green structure, and drying the green structure to obtain the three-dimensional shaped article, wherein the filaments of the consecutive layers are connected to one another at least at contact points between filaments of consecutive layers, wherein said paste composition is manufactured by mixing 70-99.8 wt. % with respect to the weight of the composition of particles of the material of interest, the material of interest being one or more compounds selected from the group of metals and metal alloys and mixtures thereof, at least one binder component, at least one additive component, which is a lubricant, one or more solvents which are miscible with each other, wherein the sum of the concentration of the at least one additive component and the at least one binder is between 0.06 wt. % and 10.0 wt. %, with respect to the weight of the composition, and wherein at least one of the additive component and the binder component or the mixture thereof are shear-thinning.

When manufacturing the paste composition of this invention it may be preferred to carry out mixing of the ingredients. Mixing may be carried out at any temperature considered suitable by the skilled person, but preferably the ingredients are mixed at room temperature. The temperature maintained in the course of mixing may be controlled at a desired level or may be left to evolve up to a certain temperature as a result of mixing energy. Preferably the temperature of the mixture during mixing is maintained below 75° C. or maximum 60° C. or 50° C., preferably maximum 40° C., more preferably maximum 30° C., and minimal 10° C., preferably minimal 15° C., more preferably minimal 20° C.

Dispensing of the paste composition of this invention may be carried out at any temperature considered suitable by the skilled person. The skilled person will be capable of selecting the appropriate dispensing temperature taking into account the nature of the paste composition, in particular the nature and amount of particles of the material of interest, the nature and amount of binder material, and the nature and amount of the at least one additive component. In case dispensing is to be carried out at an elevated temperature, for example if reducing the viscosity of the paste composition is desired, the skilled person may want to heat the temperature of the paste composition in the paste reservoir, in the nozzle or in any parts of the dispensing device located between the paste reservoir and the nozzle.

The present invention further relates to a shaped article formed by additive manufacturing, in particular by robocasting, of the paste composition described herein or using the method described herein. In particular, the present invention relates to a three-dimensional shaped article. More in particular, the present invention relates to a three-dimensional shaped article obtained by extrusion of the paste composition of this invention, the shaped article having interconnected filaments in a predetermined arrangement in a plurality of stacked layers, wherein the filaments of the consecutive layers are connected to one another. Thereby, the shaped article may be a porous structure the pores being formed a.o. by the filaments being positioned at a distance from each other in a plurality of stacked layers, it may be a substantially dense solid object or a hollow structure, or a combination of such structures.

The present invention also relates to a computer implemented method for printing a porous structure, wherein the computer implemented method is configured to operate an additive manufacturing system to perform at least the following steps:

- receiving a model of a porous object to be manufactured, and
- defining a print path depending on desired characteristics of the porous object
- depositing filaments of a paste composition as described herein according to the print path. The received model may for instance be a 3D representation of the object to be printed. The method may further comprise, prior to depositing the layer of filaments, determining the predetermined arrangement of the filaments, wherein the at least one of a: filament-to-filament distance, filament diameter, material, inter-filament properties, and intra-filament properties.

BRIEF DESCRIPTION OF THE DRAWINGS

These and other features and advantages of embodiments of the present invention will now be described in more detail with reference to the accompanying drawings, in which

FIGS. 4-7 show said force, expressed in Newton, vs. the time, expressed in minutes.

DETAILED DESCRIPTION OF THE INVENTION

Figure 1A:
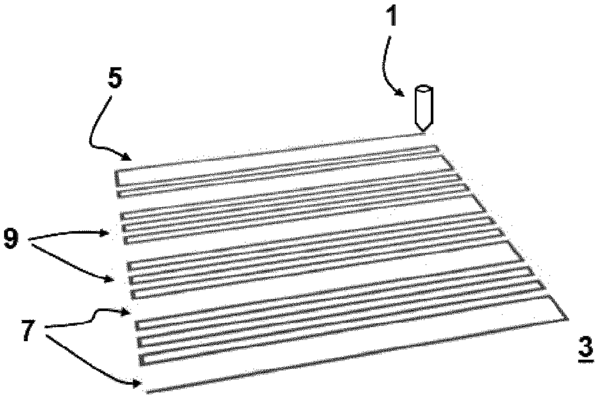
FIG. 1 shows a schematic diagram of an extrusion process.

A first aspect of the invention is to provide an additive manufacturing paste composition for manufacturing a three-dimensional shaped article of a material of interest.

A second aspect of the invention is to provide the use of one or more of a solvent-dispersible wax, a solvent-dispersible fat or a solvent-dispersible oil or a mixture of two or more thereof in a paste composition for additive manufacturing, in particular for robocasting.

A third aspect of the invention is to provide a method for producing a three-dimensional shaped article of a material of interest using additive manufacturing.

A fourth aspect of the invention is to provide a three-dimensional shaped article obtained by extrusion from that paste composition using additive manufacturing, in particular using robocasting.

A fifth aspect of the invention is to provide a computer implemented method for printing a porous structure, wherein the computer implemented method is configured to operate an additive manufacturing system.

A specific application of the paste composition described herein is as an additive manufacturing paste composition, in particular a paste composition for robocasting, that can be applied in the manufacturing of strong and open porous articles as well as dense articles with a dense structure. Such articles may be obtained by layer by layer deposition of a continuous filament, for example by depositing interconnected filaments in a predetermined arrangement in a plurality of stacked layers, wherein the filaments of the consecutive layers are connected to one another to form the articles. Thereby, the filaments of the consecutive layers may be positioned at an angle to each other. The article may have isotropic or anisotropic properties depending on the filament arrangement. A particular filament orientation or design can be employed in order to obtain the desired anisotropic properties of the article.

The paste composition can be extruded through a nozzle for three-dimensional filament deposition. The deposited filaments can form a layered network. The layers may for instance be successively printed on top of each other, resulting in a structure formed by a stack of successive layers. The filaments may be spaced apart with respect to each other in order to define channels therebetween. A porous structure with pores, i.e. holes or channels between the filaments can thus be obtained in this way. Two neighboring layers can be positioned on top of each other in an aligned way. However, it is also possible that the filaments in an upper layer run in a different direction than the fibers in a lower layer. The layer wise deposition of the filaments may include extruding a material through a deposition nozzle to form the filaments while moving the deposition nozzle relative to the print bed. The nozzle can be moved with respect to the print bed, and/or vice versa. Hence, kinematic inversions are also envisaged. Different types of porous structures can be obtained. Such structure may represent a mesh, a lattice structure, a filament network, a scaffold, a filament framework, or the like. Many types of arrangements and structures are possible. The specific arrangement of the filaments may be selected based on the application.

It will be appreciated that the extruded filament may also be known in the art as a strut, fibre/fiber, rod, raster, extrudate, and other terms.

The paste composition of this invention is suitable for use with different types of direct extrusion additive manufacturing arrangements wherein a viscous paste composition is fed from a paste feed or supply or reservoir towards a nozzle and displaced through the nozzle while subjecting the paste composition to a pressure. As a result, the paste composition is expelled from the nozzle in the form of a long continuous filament, strut, fibre, rod, extrudate or similar of the paste composition, or a plurality of such filaments, struts, fibres, rods, extrudates or similar of a certain length leaving the nozzle. Between the paste composition supply or feed and the nozzle, the arrangement may contain some tubing and any other suitable parts, for example an extrusion screw. Thus produced filament or filaments are positioned in a 3D arrangement to provide the 3D shaped object or article.

The paste composition of this invention is particularly suitable for use in such additive manufacturing techniques which make use of the direct extrusion of a viscous paste into a 3D shaped article with a desired filament arrangement and structure. The paste composition of this invention is for example suitable for use with screw extrusion or syringe extrusion or the like. A combination of these technologies is also possible. In syringe extruders material can be placed into a syringe and the printer can depress the plunger at a controlled rate to displace the paste composition through a nozzle and dispense or extrude filaments in a desired shape and length and 3D arrangement. The syringes may be filled with the paste composition of this invention. Different types of syringe extrusion systems are possible. A pneumatic pressure can be applied to the plunger. Alternatively, the plunger can be depressed by means of a mechanical displacement for instance achieved by means of an electric motor. Mechanical displacement may allow for more direct control over the volumetric extrusion rate whereas in pneumatic printers, the extrusion rate may additionally depend on an interplay between needle geometry, material viscosity, pneumatic pressure, and obstruction by previously extruded filaments. Other alternative designs are also possible. In screw extruders a material can be fed into a screw that is surrounded by a close-fitting sleeve, called a barrel. As the screw rotates, material can be forced through the nozzle at the end of the barrel. The rate of material extrusion from the nozzle can depend on the screw rotation speed. Screw extruders can accommodate materials in paste form, however, for example granules can also be used. Additive manufacturing software may control the extrusion rate based on the desired diameter of extruded filaments and the speed at which the nozzle is moving. Various systems can be used for performing the extrusion based additive manufacturing method according to the invention.

The additive manufacturing paste composition for 3D printing a material of interest according to embodiments of the invention comprises the following components:

- 70.0-99.8 wt. % with respect to the weight of the composition of particles of the material of interest, the material of interest being one or more compounds selected from the group of metals and metal alloys and mixtures thereof,
- at least one binder component,
- at least one additive component, which is a lubricant,
- one or more solvents which are miscible with each other, wherein the sum of the concentration of the at least one additive component and the at least one binder is between 0.06 wt. % and 10.0 wt. % with respect to the weight of the composition, and wherein at least one of the additive component and the binder component or the mixture thereof are shear-thinning.

The paste composition may further contain a solvent and any further conventional additional ingredients. The paste composition of the present invention shows several material and mechanical properties, which make it particularly suitable for use in additive manufacturing, in particular in robocasting of three dimensionally shaped articles, for the following reasons.

Firstly, the paste composition of this invention has been found capable of satisfying certain criteria in relation to the rheology of the composition. Due to the presence of the binder and the additive, the paste composition as such shows a desired cohesion and a desired viscosity that is sufficiently high to obtain a paste like mass that shows desired rheological properties to be displaced through a nozzle with the purpose of shaping the paste into a filament or fibre of strut or any other desired form, wherein the filament is intended to be positioned on a print surface and to be positioned in a 3D arrangement in a layered arrangement, wherein filaments of adjacent layers contact each other and adhere to each other at least at contact points, to provide a so-called green form which when subjected to drying and sintering gives rise to the desired 3D article of the material of interest. The presence of a limited amount of at least one of the binder or the additive component appears to have a beneficial effect on the extrusion behaviour of the paste when used in combination with a wide variety of materials of interest, in particular one or more metals, one or more metal alloys or a mixture thereof. In particular, the presence of a limited amount of at least one of the binder or the additive provides the paste composition with pseudo-plastic properties, which enable the paste composition to be forced to flow through and to be expelled from the opening of a nozzle, for example a nozzle of an extrusion device as is typically used in robocasting, without the need of applying excessive forces. The presence of a limited amount of at least one of the binder or the additive component appears sufficient to facilitate transport of the paste composition through the nozzle and ejection therefrom and appears capable of minimising the risk to sticking of the paste composition to the walls which delimit the nozzle opening and would cause paste clogging in the nozzle and lead to the occurrence of defects in the filaments being extruded from the nozzle.

Besides this, as has been described above, the paste composition of this invention may exhibit an improved cohesive strength, with which is also meant that the paste composition may exhibit a minimum risk to phase separation of a fluid and solid phase upon manufacturing and storage of the paste composition. This effect has been observed even when the paste composition is subjected to typical pressures used in extrusion devices to achieve displacement of the paste from a feed towards and through a nozzle with a relatively small cross section when compared to the dimensions of the feed, when converting the bulk paste into a filament by extrusion through a nozzle or multiple nozzles.

As a result of the shear thinning properties, but also as a result of the improved cohesive strength, paste compositions with a high solids content i.e. higher concentrations in terms of weight percentage of the material of interest can be manufactured and used for the manufacturing of a three dimensional shaped article, when compared to paste compositions known in the art that do not contain at least one of the binder and the additive component. Thus three-dimensional shaped articles may be obtained with a high content of material of interest, a high density and a high purity because of the reduced organic content resulting from the binder material, the at least one additive and the at least one solvent. Also, the need to increase the force or pressure applied on the paste in the load cell of the extrusion or depositing device to achieve extrusion rate at a desired rate or speed, may be obviated. Increasing the pressure is a typical measure taken upon extrusion of paste compositions when phase separation of a liquid out of a paste occurs, and the separation of the solvent from the remainder of the paste composition imposes the need to increase the pressure to achieve that a paste with increasing solid state content may be transported through the nozzle of an extruder.

Paste compositions of this invention may also show a minimal tendency to cause clogging of the nozzle or to defects in the filaments leaving the nozzle, for example in the form of local deformations or interruptions. It will be appreciated that the degree to which these effects are observed, may depend on the particularities of the paste composition, in terms of concentration and nature of the paste components, particle size distribution of the particles of the material of interest, etc.

Secondly, depending on a.o. the dimensions and geometrical arrangement of the filaments, and in order to minimise the risk to flowing of the paste composition and deformation of the shaped paste composition extruded from the nozzle, the paste composition will contain a sufficiently high concentration of particles of the material of interest, i.e. the material of which the shaped article will be essentially made in order to permit producing an article with a desired mechanical strength and integrity. Consequently, it is desired that the paste composition contains as few solvent, binder, additive and other components as possible. Therefore, the concentration of the material of interest in the paste composition of this invention is at least at least 70.0 wt. %, preferably at least 75.0 wt. %, preferably at least 80.0 wt. % with reference to the total weight of the paste composition. With concentrations of at least 70.0 wt. % of the particles of the material of interest, a three dimensional shaped article may be obtained after sintering, with a high solids content, a high material density, a high mechanical strength, a high purity and a low organics content. The high purity may be important for certain applications and will favour the mechanical strength and mechanical properties of the shaped article. It will be appreciated that the concentration of the material of interest may vary within some ranges, as account needs to be taken of the varying nature and density of possible materials of interest. The concentration of the material of interest in the paste composition will generally be maximum 99.8 wt. % with reference to the total weight of the paste composition, preferably maximum 99.5 wt. %, preferably maximum 99.0 wt. %, more preferably maximum 95.0 wt. %, most preferably maximum 90.0 wt. % depending on the nature and density of the material of interest. Depending on the density of the particles of the material of interest and the particle size, too high concentrations of material particles in the paste risk to cause clogging of the nozzle of the depositing device which may be temporary or last for a longer period of time, leading to interruptions of the deposited filament or local thickening of the deposited filament and subsequent rejection of the printed product. Consequently, mass production using such a paste would be characterized by high failure rates.

In order to imply pseudo plastic properties to the paste composition of this invention, the sum of the concentration of the at least one additive component and the at least one binder will usually be maximum 10.0 wt. %, preferably maximum 7.5 wt. % or 7.0 wt. % with respect to the total weight of the composition, more preferably maximum 6.0 wt. %, depending on the nature and density of the material of interest. It will be further understood that the sum of the concentration of the at least one additive component and the at least one binder will usually be at least 0.06 wt. %, preferably at least 0.1 wt. %, more preferably at least 0.4 wt %, even more preferably at least 0.7 wt. %, more preferably at least 1.0 wt % and most preferably at least 1.5 wt % with respect to the total weight of the composition.

The material of interest contained in the paste composition of this invention may be selected from a wide variety of metals or metal alloys known to the skilled person. The material of interest can be a metal in the metallic state or a mixture of two or more metals in the metallic state. According to embodiments, the metal may be selected from the following: titanium, tantalum, tungsten, molybdenum, copper, aluminium, silver, platinum, iron, gold, tin and combinations of two or more thereof.

The material of interest may be a metal alloy or a mixture of two or more alloys. An alloy is a combination of two or more metals or metals combined with one or more other elements. Examples of metal alloys suitable for use with this invention include aluminium alloys; stainless steel alloys, including alloys of austenitic, ferritic and martensitic stainless steels; cobalt alloys; copper alloys; nickel alloys; silver alloys; gold alloys; platinum alloys, ferro alloys, for example iron-chromium alloys, silver-copper alloys, titanium alloys, beryllium copper alloys, titanium-6aluminium-4-vanadium, zinc alloys.

The material of interest may further be a mixture of one or more metals and one or more metal alloys.

Preferably, the material of interest has the form and shape of particles, which are typically characterized by a specific particle size distribution as well as a specific surface area. Particles of the material of interest will typically have a mean particle diameter which is at least 5 μm, preferably at least 10 μm, more preferably at least 15 μm, even more preferably at least 20 μm and most preferably at least 25 μm, although smaller particles for example with an average diameter of 1 or 2 μm may also be present. It is furthermore understood that said mean particle diameter will generally be at most 100 μm, preferably at most 90 μm, more preferably at most 80 μm, even more preferably at most 70 μm, more preferably at most 60 μm, even more preferably at most 50 μm, and most preferably at most 40 μm. According to preferred embodiments, particles of the material of interest will have a mean particle diameter in the range of between 30 and 50 μm. It will however be clear to the skilled person that the mean particle size and the preferred ranges of mean particle size may be different for different materials of interest and may be outside of the ranges described above. The particle size of the material of interest may be suitably selected by the skilled person depending on the cross section of the nozzle through which the paste composition is to be displaced and extruded, so that extrusion of a filament of a desired cross section may be achieved, with a minimum risk to clogging of the nozzle.

The skilled person will thereby appreciate the general relation between the mean particle diameter of the material of interest and the weight percentage of the material of interest with respect to the total weight of the paste composition. In order to be printable in an acceptable manner, it will be understood that a material having a fine grain size will in general be limited to a maximum weight percentage that is lower relative to a composition wherein said material has a coarser grain size, as the latter case may dispose of rheological properties requiring less force in the loadcell to push the paste comfortably through the nozzle. It is further understood that one of the advantages of the invention is that such limitations for the maximum operable weight percentages can be shifted to higher values through the inclusion of said at least one additive component.

According to embodiments of the invention, said at least one binder component can be an inorganic or an organic compound or a mixture of one or more inorganic and one or more organic compounds. It will be appreciated that the nature of the binder, i.e. whether use is made of a binder with a more hydrophilic or a more hydrophobic nature, may vary with the nature and composition of the paste composition.

Preferably however, said at least one binder is an organic compound, more preferably an organic compound capable of modifying the rheology or flow properties of the paste composition under the influence of pressure. According to preferred embodiments, said at least one binder component is selected from the following: plasticizers, hydrocolloids, cellulose derivates like methyl cellulose and ethyl cellulose and/or combinations thereof, polymeric alcohols in particular polyvinyl alcohol, polyalcohols for example polyethylene glycol, polyvinylpyrrolidone, poloxamers i.e. nonionic triblock copolymers capable of self-assembling and thermos-gelling and composed of a central hydrophobic chain of polyoxypropylene (poly(propylene oxide) flanked by two hydrophilic chains of polyoxyethylene (poly(ethylene oxide) generally available under the name Syperonic (Croda), Pluronic (BASF) and Kolliphor (BASF), and combinations of two or more of the afore-mentioned binder materials. It shall be clear to the skilled person that other materials showing equivalent properties can be used as well.

Suitable plasticizers for use with the present invention include monomeric esters of typically $C_8$ to $C_{14}$ alcohols and organic acids which may be saturated or unsaturated, and may either be mono- or polycarboxylic organic acids. Examples of organic acids suitable for use in the plasticizer of this invention include esters of trimellitic acid (for example, octyl trimellitate—TMO), sebacic acid (for example dioctyl sebacate—DOS, diisodecyl sebacate—DIDS), azeleic acid (for example dioctyl azelate—DOZ), adipic acid (for example dioctyl adipate—DOA, diisodecyl adipate—DIDA, ditridecyl adipate (DTDA), phthalic acid (for example, dibutyl phthalate—DBP, dioctyl phthalate—DOP, diundecyl phthalate—DUP, ditridecyl phthalate—DTDP), citric acid, benzoic acid, glutaric acid, fumaric acid, maleic acid, oleic acid (for example butyl oleate), palmitic acid and azelaic acid and mixtures of two or more hereof. Esters of phosphoric acid may also be used. The skilled person will be capable of selecting the appropriate plasticizer taking into account the temperature at which the composition is to be processed and the volatility of the plasticizer. Preferred are those plasticizers which have a high molecular weight, preferably at least 300, more preferably at least 350.

Examples of alcohols suitable for use in such monomeric plasticizers, can be linear or branched $C_8$ to $C_{14}$ alcohols. In a preferred embodiment use is made of a $C_9$ fatty alcohol or diol, comprising at least 60 wt. %, or at least 80 wt. %, but maximum 95 wt. % % straight-chain alcohols. The concentration of branched $C_9$ alcohols may be maximum 40 wt. %, preferably between 5 and 40 wt. %. The alcohol may contain at least 15 wt. % of branched nonyl alcohols having branching at the 2-carbon position.

The aforementioned plasticizers may be used in combination with at least one polymeric plasticizer. It is however preferred that the content of the polymeric plasticizer is at least 10.0 wt % relative to the total amount of plasticizer present.

Suitable polymeric plasticizers include those obtained from the condensation of a dicarboxylic acid, a tricarboxylic acid or a polycarboxylic acid or a mixture of two or more of the aforementioned carboxylic acids, with a diol or of a mixture of various carboxylic diacids with one or more diols. Suitable dicarboxylic acids for the preparation of such polymeric plasticizers include phthalic acid, terephtalic acid, adipic acid, sebacic acid, succinic acid, citric acid, trimellitic acid etc. Other suitable polycarboxylic acids include alicyclic carboxylic acids selected from the group of aromatic tricarboxylic acids and their derivatives, in particular 1,2-cyclohexanedicarboxylic acid, 1,4-cyclohexanedicarboxylic acid, 4-cyclohexene-1,2-dicarboxylic acid or derivatives thereof. Examples of diols suitable for use in such polymeric plasticizers include for instance ethylene glycol, propylene glycol, butanediol, hexanediol. Other suitable polymeric plasticizers for use with the present invention include, in particular a polyphthalate or a polyadipate.

According to embodiments of the invention, said at least one binder component has a concentration which is at least 0.01 wt. %, in weight percent dry matter, with reference to the total weight of the paste composition, preferably at least 0.025 wt. %, more preferably at least 0.10 wt. % or 0.25 wt. %, most preferably at least 0.50 wt. % or at least 0.75 wt. %, or at least 1.0 wt. %. It is further understood that the at least one binder component will usually be contained in the paste composition in a concentration which is at most 7.5 wt. %, preferably at most 6.0 wt. %, more preferably at most 5.0 wt. %, most preferably at most 3.0 wt. %, in particular at most 2.5 wt. % in weight percent dry matter, with reference to the total weight of the paste composition.

According to embodiments of the invention, said at least one additive component is a wax, a fat or oil or a mixture of two or more hereof which is capable of being dispersed in the one or more solvents contained in the paste composition of this invention. Preferably however, the at least one additive component is a water-dispersible wax, oil or fat.

The term “wax” is to be understood as defined by the Deutsche Gesellschaft für Fettwissenschaft in the DGF standard method M-I 1. As the chemical composition and origin of different waxes differ greatly, waxes are defined via their mechanical-physical properties. A substance is called wax if it can be kneaded at 20° C., is strong to brittle hard, has a coarse to finely crystalline structure and is translucent to opaque in colour, but not glass-like; it melts above 40° C. without decomposing, is readily liquid (of low viscosity) a little above the melting point and not stringy; it has a strongly temperature-dependent consistency and solubility, and can be polished under light pressure. Waxes typically pass into the molten state between 40 and 130° C. In other words, the term “wax” as used herein refers to a mixture of substances (or a substance) if it (i) contains at least one substance having long, unsaturated alkyl chains (usually $>C_{15}$) and (ii) is kneadable and solid to brittle-rigid and at a temperature of 20° C. to 25° C., and melts into a low-viscosity liquid at a temperature of 40° C. to 45° C.

Waxes suitable for use in the present invention preferably have a melting point in the range of from 40 to less than 80° C., preferably from 45 to 65° C. Preferred waxes have a shear rate of 1000 $s^{-1}$. Further preferred waxes have a viscosity of ≤10 mPa·s, preferably from 5 to 10 mPa·s, more preferably from 3 to 4 mPa·s.

For the purpose of the invention, the term “water-dispersible wax” refers to a wax whose dispersibility in water is equal to or greater than a certain minimum weight per litre of water at ambient temperature.

Waxes suitable for use with the present invention include vegetable and animal waxes, mineral waxes, petrochemical waxes, chemically modified waxes and synthetic waxes. Examples of vegetable waxes suitable for use with this invention include candelilla wax, carnauba wax, Japan wax, esparto wax, cork wax, guaruma wax, rice germ oil wax, sugar cane wax, ouricury wax, montan wax. Examples of animal waxes suitable for use with this invention include beeswax, shellac wax, spermaceti, lanolin (wool wax), rump fat. Examples of mineral waxes suitable for use with this invention include ceresin, ozokerite (earth wax). Examples of chemically modified waxes suitable for use with this invention include montan ester waxes, sasol waxes, hydrogenated jojoba waxes, or synthetic waxes, e.g. paraffin, polyalkylene waxes, polyethylene glycol waxes.

The most preferred additive component is an animal wax, in particular lanolin for its ability to assist in the extrusion of paste compositions having a high content of metal and/or metal alloy, with minimal phase separation and minimal clogging of the nozzle even at low temperatures, i.e. temperatures in the vicinity of room temperature, such as temperatures between 15 and 50° C., preferably between 20 and 40° C. This temperature may refer to the temperature maintained in the nozzle or the temperature of the paste composition. In the exceptional circumstances where some clogging would occur, this can easily be repaired by slight heating of the nozzle. Lanolin is the name given to derivatives of wool grease and it is as such a yellow waxy substance secreted by the sebaceous glands of sheep. As it is essentially devoid of glycerides, lanolin does not qualify as a fat, but as a wax. Like many other natural products, lanolin has a complex and variable composition. Lanolin as used herein refers to a complex mixture of compounds which is predominantly composed of esters of higher fatty acids. More in particular, a high purity grade of lanolin is composed predominantly of long chain waxy esters (ca. 97% by weight), the remainder being lanolin alcohols, lanolin acids and lanolin hydrocarbons.

According to a preferred embodiment, the at least one additive component is a fat which is dispersible in the solvent, in particular water, contained in the paste composition of this invention. Within the scope of the present invention, a mixture of substances or a substance is referred to as a fat if it contains or is at least one fatty acid triglyceride, is present in a solid state at a temperature of 25° C., and is substantially insoluble in water. Among others, fats can be of animal or plant origin.

As an alternative to the animal wax, according to another preferred embodiment of this invention, the at least one additive component may be an oil. A compound is considered an oil if it is present in a liquid state at a temperature of 25° C., has a higher viscosity than water and is not miscible with water (i. e. forms separate phases upon an attempt to be mixed with water). The oil may be a fatty oil, i.e. a mixture of fatty acid triglycerides from animals or plants, a mineral oil or a silicone oil or a mixture of two or more hereof.

As another alternative to the animal was, according to a further preferred embodiment, the at least one additive component may be a thixotropic polyamide composition, for example a composition disclosed in WO2019133255.

Although the concentration of the additive may vary within some ranges, it is preferred that the concentration of the at least one additive component is at least 0.05 wt. % or at least 0.10 wt. %, preferably at least 0.15 wt. %, more preferably at least 0.20 wt. % or at least 0.25 wt. % or most preferably at least 0.50 wt. %, more preferably at least 0.75 wt. % with respect to the total weight of the composition. Although the maximum preferred concentration may vary, preferably the maximum concentration of the at least one additive component will be at most 7.5 wt. %, preferably at most 6.0 wt. %, more preferably at most 5.0 wt. %, most preferably at most 3.0 wt. %, in particular at most 2.5 wt. % in weight percent dry matter, with reference to the total weight of the paste composition.

According to embodiments of the invention, the paste composition may further comprise one or more solvents. Typically, the solvent used in the paste composition of this invention is water, preferably deionized water. Alternatively, said solvent can be one of the following or a mixture of two or more thereof: water, an organic solvent, an ionic liquid or a mixture of two or more hereof. The solvent used in the paste composition of this invention is preferably one or more solvents selected from the group of water, an alkanol, a ketone, or a mixture of two or more hereof, more preferably one or more solvents selected from the group of water; deionized water, ethanol, isopropyl alcohol, acetone, ethyl acetate or a mixture of two or more hereof. Other solvents that may be considered for use with the present invention include 1,2-propanediol, 1,3-dioxolane, 1,4-dioxane, 1-methyl-2-pyrrolidinone, 2-(2-Butoxyethoxy)ethyl acetate, acetonitrile, butoxy ethyl acetate, dimethyl adipate, dimethyl carbonate, hexane, methyl ethyl ketone, methyl isobutyl ketone, n-pentane, xylene, etc However, where the paste composition of this invention contains an oil, a fat or a wax, i. e. the oil, fat or wax may represent the main constituent of the composition in relation to the total mass and can, for example, serve as a solvent or carrier.

The composition of this invention may comprise further conventional ingredients of a viscous paste. One type of conventional ingredients includes for example one or more dispersants. Useful dispersants include but are not limited to darvan, targon, triton. Preferably, they are applied in an amount of between 0.01 wt. % and 5.0 wt. %, and preferably of between 0.1 and 3.0 wt. %, more preferably between 0.5 wt. % and 3.0 wt. %. Other conventional ingredients that may be contained in the paste composition of this invention include thixotropic agents not limited to, castor oil and its derivatives, organic clays, polyamides and its derivatives, fumed silica, carboxylic acid derivatives, preferably fatty acid derivatives (e.g., $C_9H_{19}COOH$ (capric acid), $C_{11}H_{23}COOH$ (lauric acid), $Ci_{13}H_{27}COOH$ (myristic acid), $C_{15}H_{31}COOH$ (palmitic acid), $C_{17}H_{35}COOH$ (stearic acid), $C_{18}H_{34}O_2$ (oleic acid), $C_{18}H_{32}O_2$ (linoleic acid)), or combinations thereof. Commercially available thixotropic agents, such as, for example, Thixatrol® MAX, Thixatrol® ST, or THIXCIN® E, may also be used. The paste composition may further comprise one or more of the following components: filler materials for optimizing the rheological and/or mechanical properties of the paste, pigments, surfactants or foaming materials. Such materials are known in the state of the art. The concentration of these components will usually be limited so as to minimise the risk to adversely affecting the desired properties of the paste composition such as rheology, viscosity, etc.

The paste composition described above is particularly suitable for use in robocasting, i.e. a technique where a viscous paste is fed to a nozzle with a desired cross section, displaced through the nozzle and expelled from the nozzle to be deposited on a print surface as a paste in the form of filaments or fibres or struts or beads or the like. Robocasting may also be referred to as 3D printing, 3DFD, 3D fibre deposition, filament deposition, micro-extrusion etc., or a combination of two or more of these. In particular, the paste composition described above is suitable for us in a system for manufacturing a three dimensional structure, the system including: an extrusion unit including a nozzle with a nozzle outlet and a paste reservoir in fluid communication with said nozzle outlet, wherein the extrusion unit is arranged for depositing, through the nozzle outlet, filaments of the paste composition in a predetermined interconnected arrangement in a plurality of stacked layers for forming a three dimensional structure, a measuring unit including at least one sensor at the nozzle for monitoring, during discharge of the filaments by the extrusion unit, a pressure value applied on the build material in the material reservoir of the nozzle for discharging said build material through the nozzle outlet, and a processing unit configured to process the monitored pressure value for identifying an irregular rising and/or falling of the pressure value with respect to a plateau level of the pressure value reached during discharge, wherein the processing unit is also configured to control the extrusion unit such as to adjust an extrusion parameter in order to compensate for the irregular rising and/or falling of the pressure value, wherein during an irregular rising the pressure value momentary spikes, wherein during an irregular falling the pressure value momentary drops. Examples of deposition parameters that may be adjusted in the course of the printing process to compensate for an irregular rising or falling of the pressure value include without being limited thereto adjusting, i.e. increasing or reducing, the pressure exerted to the print material for example in the print material reservoir or in the nozzle or at any position of the print material feed line before the print material leaves the nozzle; adjusting the viscosity of the print material, for example by heating or cooling the print material, by adjusting the amount of solvent contained in the print material, by supplying a release agent, in the reservoir, the nozzle or any position of the print material feed line before the print material leaves the nozzle; adjusting the print material flow rate, subjecting the print material to vibration; adjusting the nozzle opening, etc, To allow for an early compensation of an irregular rising or falling of the pressure value, the measuring unit may include a load sensor positionable at a nozzle reservoir, between nozzle reservoir and nozzle, or at the nozzle.

The invention is now illustrated in more detail in the following detailed description of the figures. FIG. 1 shows a schematic diagram of a print path in an extrusion process for manufacturing a three-dimensional porous structure. The print path illustrates how the filaments of the porous structure are deposited on the plurality of layers. The method includes depositing interconnected filaments 7, 9 in a predetermined arrangement in a plurality of stacked layers. The filaments 7, 9 of the consecutive layers 11 are connected to one another to obtain the porous structure with interconnected pores. Furthermore, filaments of the consecutive layers may be angled with respect to each other.

In the extrusion process, a nozzle 1 is scanned along a print bed or positioning stage 3 depositing filaments following the shown print path 5. It will be appreciated that it is also envisaged that the print bed 3 is moved instead of the nozzle 1 (kinematic inversion). A combination is also possible. In an alternative example, both the nozzle 1 and the print bed 3 can be moved during at least portions of the deposition process.

Figure 1B:
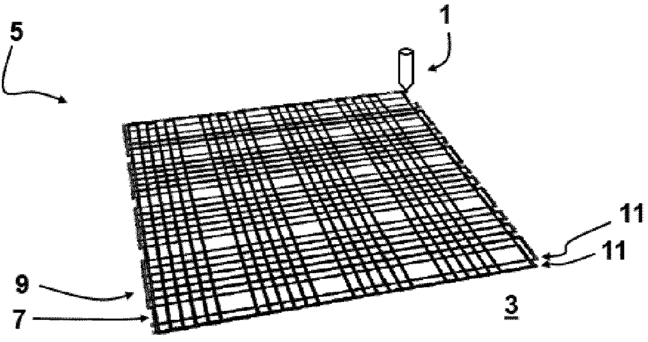
Figure 1C:
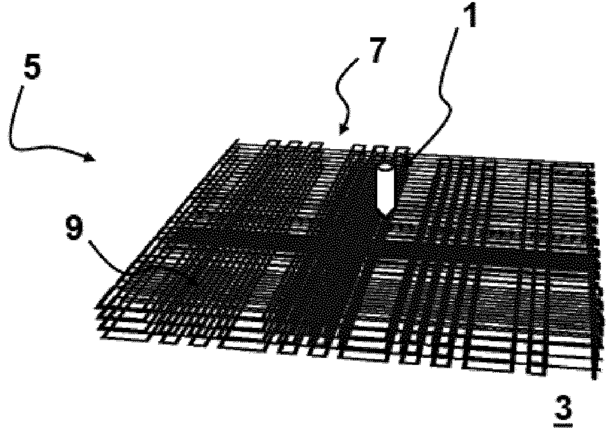

In FIG. 1*a*, the print path 5 for the first layer on the print bed 3 is shown. In FIG. 1*b*, the print path 5 of two layers is shown. In FIG. 1*c*, the print path 5 is shown in which the fourth layer has not been finished yet.

By altering the deposition pattern, the local mechanical properties of the porous structure may be locally changed. In the example shown, the porous structure being printed has a non-homogeneous filament-to-filament distance (interspacing).

Figure 2:
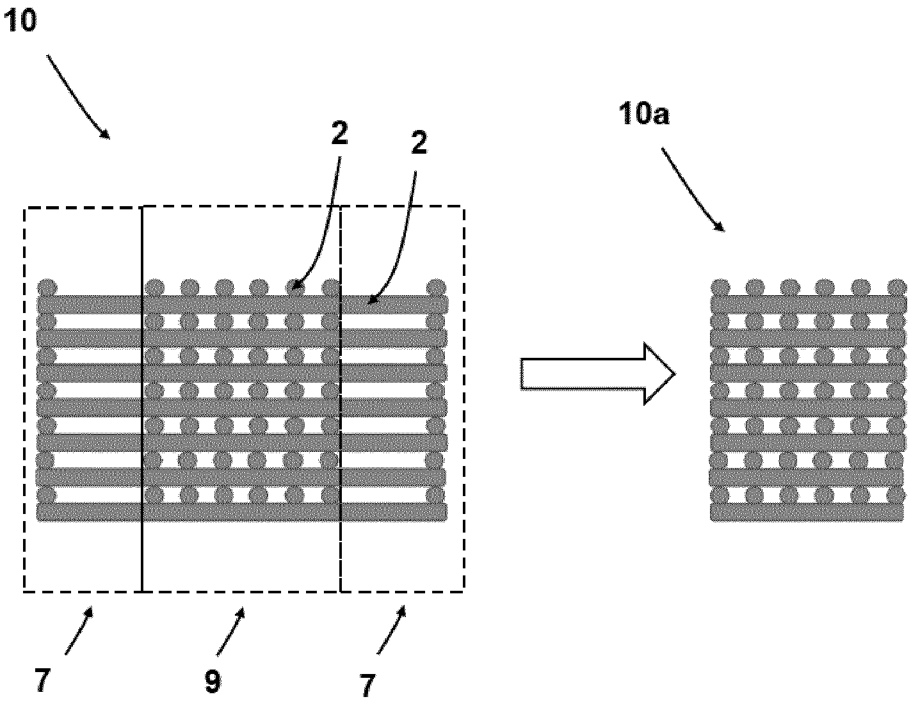
FIG. 2 shows a schematic diagram of embodiments of a porous structure.

FIG. 2 shows a cross sectional side view of a schematic diagram of an embodiment of a porous structure 10,10*a* with a plurality of layers 11 of deposited filaments 2 stacked on each other. The filaments 2 have a filament diameter D and a filament-to-filament distance A (not shown on the figure). The filament-to-filament distance may be constant or may be varied in the filament arrangement.

Figure 3:
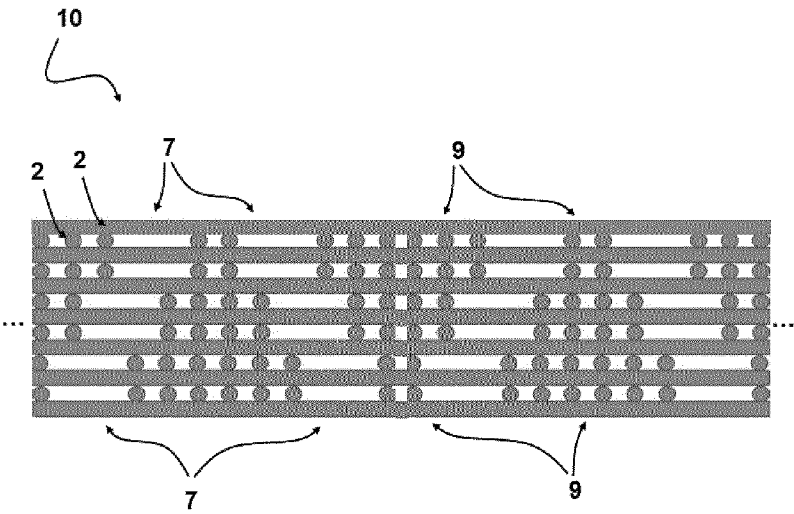
FIG. 3 shows a schematic diagram of an embodiment of a porous structure.

FIG. 3 shows a schematic diagram of an embodiment of a porous structure 10 with a different filament arrangement.

While the invention has been described hereinabove with reference to specific embodiments, this is done to illustrate and not to limit the invention. The skilled person will readily appreciate that different combinations of features than those described herein are possible without departing from the scope of the invention.

The present invention is further illustrated in the examples below.

Example 1-3

Ti powder (AP & C) consisting of mainly spherical particles of Ti-6Al-4V grade V, with an average particle size of between 0-20 μm, was mixed with methylcellulose in water (Across) and lanolin (Adeps Lanae, Fagron) in the amounts indicated in table 1 below. A homogeneous paste was obtained, which did not show phase separation.

TABLE 1

| Example | Lanolin (wt. %) | Methyl-cellulose (wt. %) | Water (wt. %) | Ti (wt. %) | Water content after extrusion (wt. %) | Extrusion pressure 400 μm (N) | Extrusion pressure 800 μm (N) |
|---|---|---|---|---|---|---|---|
| 1 | 0.25 | 0.43 | 11.89 | 87.43 | | 200-1000 | 300 |
| 2 | 0.63 | 0.43 | 11.55 | 87.09 | 10.38 | 300-400 | |
| 3 | 1.26 | 0.43 | 10.91 | 87.42 | 10.78 | 200 | 130 |
| Comparative example A | 0 | 0.43 | 11.21 | 87.43 | 10.0 | 600-1450 | 500-2500 |

Figure 4A:
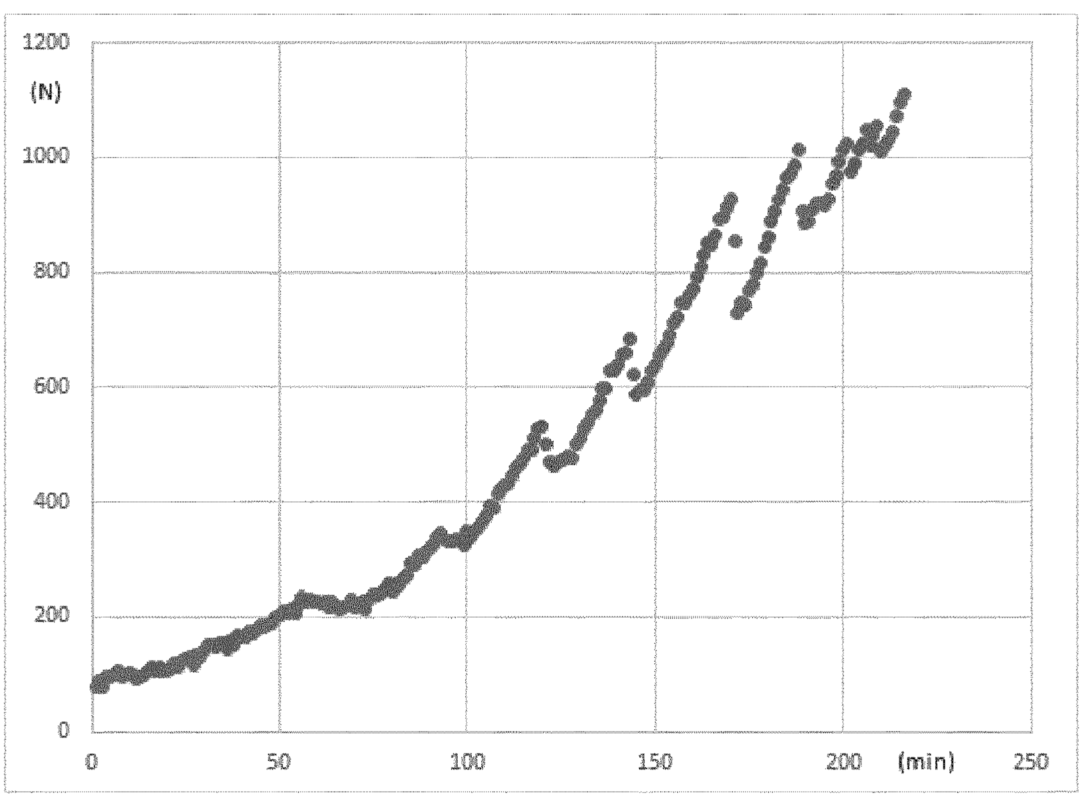
FIGS. 4-7 show the force applied in the load cell of a filament depositing device as a function of time, for paste compositions as described in the examples here below. More in particular.
Figure 4B:
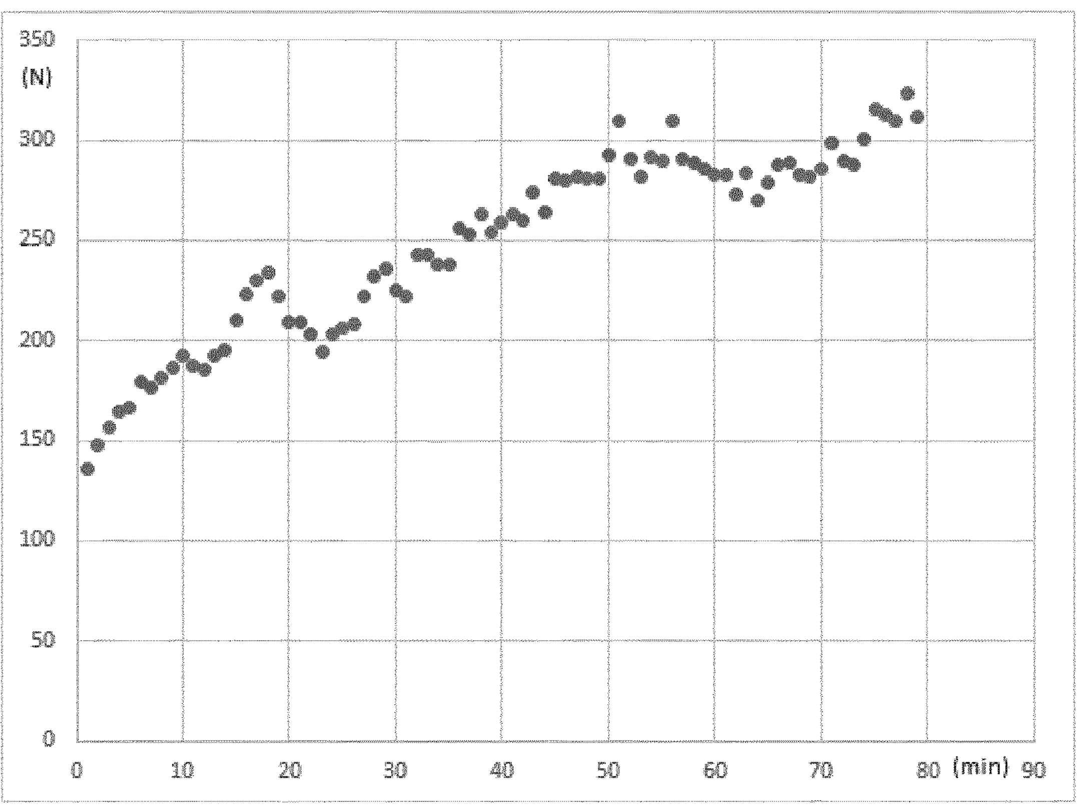

The paste was 3D printed using a fibre deposition device, to respectively provide a continuous filament with 1) an average diameter of 400 μm, at an extrusion rate of 250 μl per minute
2) an average diameter of 800 μm, at an extrusion rate of 700 μl per minute FIGS. 4*a* and 4*b* respectively show the force (N) on the Y-axis applied as a function of time (min) on the X-axis for example 1, using a 400 μm and 800 μm cross section nozzle. It is thereby understood that a constant and moderate force is beneficial for a smooth and successful deposition of a paste filament on an underlying layer.

From FIGS. 4*a* and 4*b* it can be observed that a continuous increase of the pressure exerted to the paste composition is needed to achieve extrusion.

Figure 5:
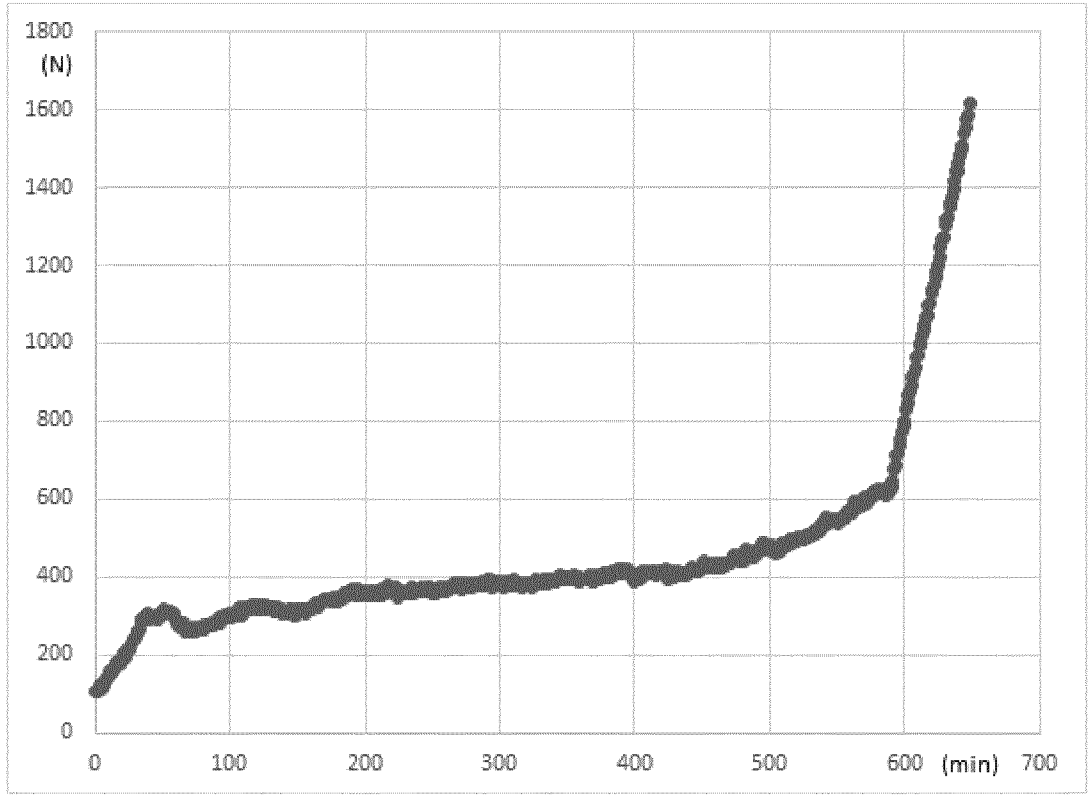

FIG. 5 shows the force (N) on the Y-axis applied as a function of time (min) on the X-axis for example 2, using the 400 μm cross section nozzle. From these figures it can be observed that once the pressure is applied, extrusion of a continuous filament may be achieved by subjecting the paste composition to a virtually constant pressure.

Figure 6A:
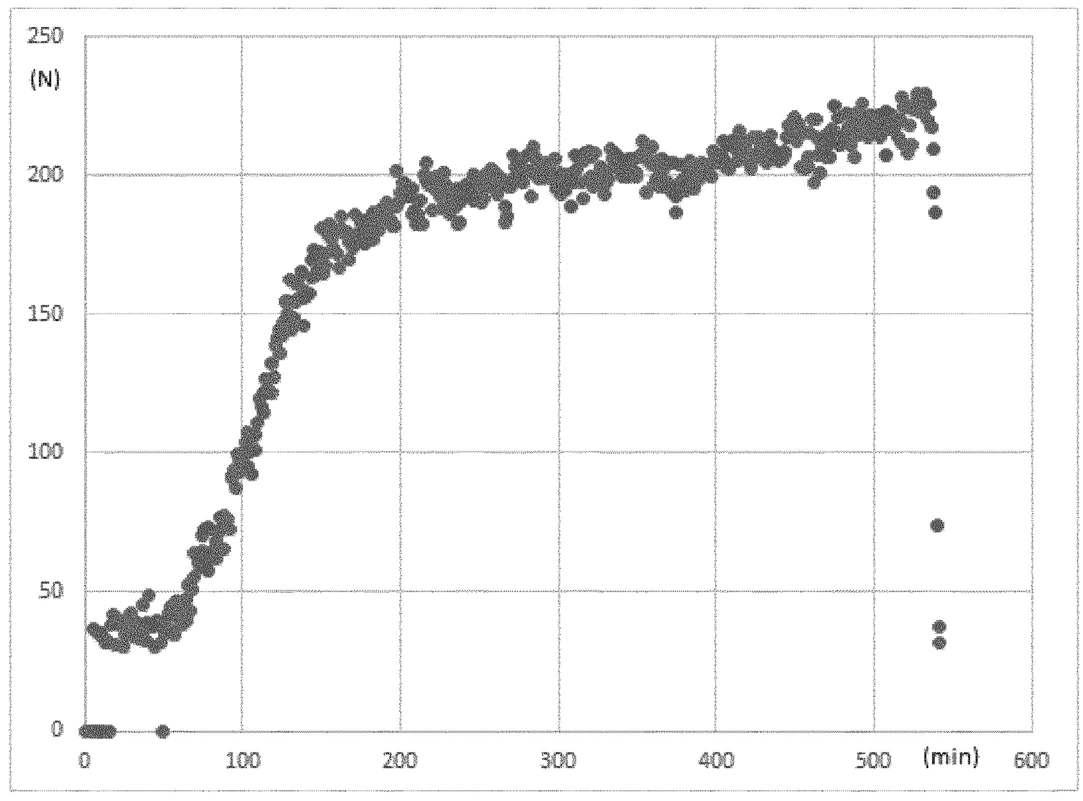
Figure 6B:
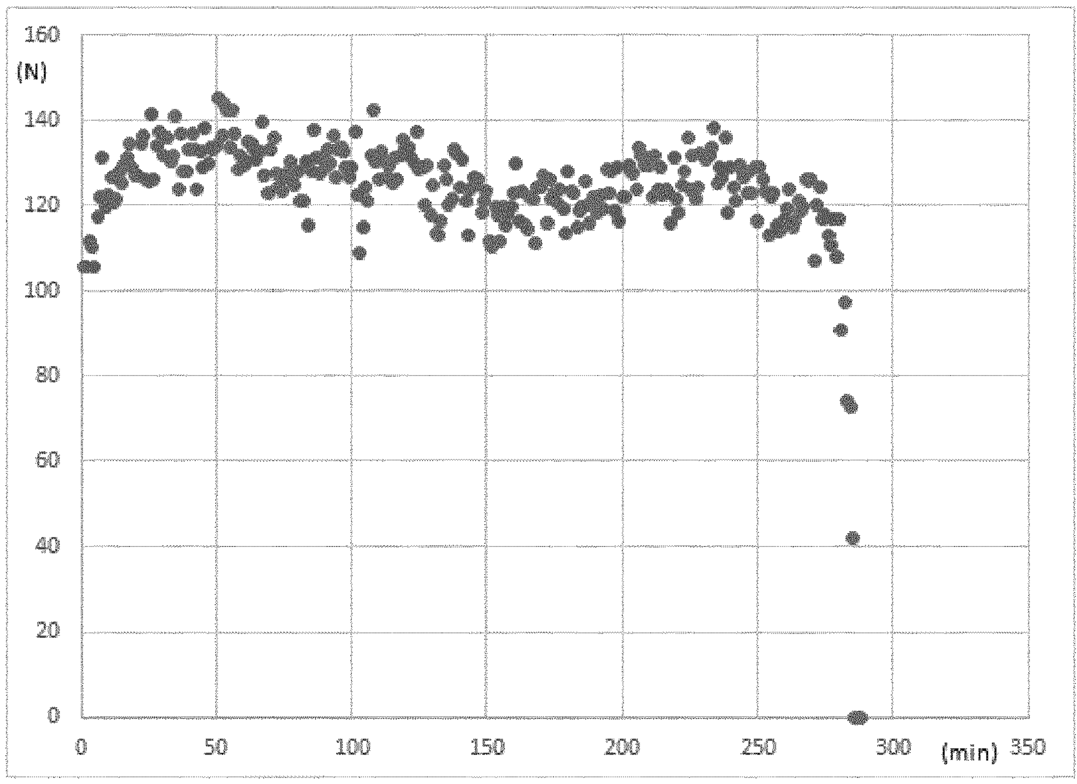

FIGS. 6*a* and 6*b* respectively show the force (N) on the Y-axis applied as a function of time (min) on the X-axis for example 3, using a 400 μm and 800 μm cross section nozzle. From these figures it can be observed that once the pressure is applied, extrusion of a continuous filament may be achieved by subjecting the paste composition to a virtually constant pressure.

All paste compositions allowed for extrusion of filaments without any visible defects. The water content of the paste of example 3 before and after extrusion were similar. In case of example 2 the water content of the paste composition after extrusion dropped. It may be concluded that a minimal amount of additive is needed to minimise phase separation.

Comparative Example A

Example 1 was repeated, with the exception that no lanolin was incorporated in the paste composition (see table 1). A homogeneous paste was obtained, which did not show phase separation.

Figure 7A:
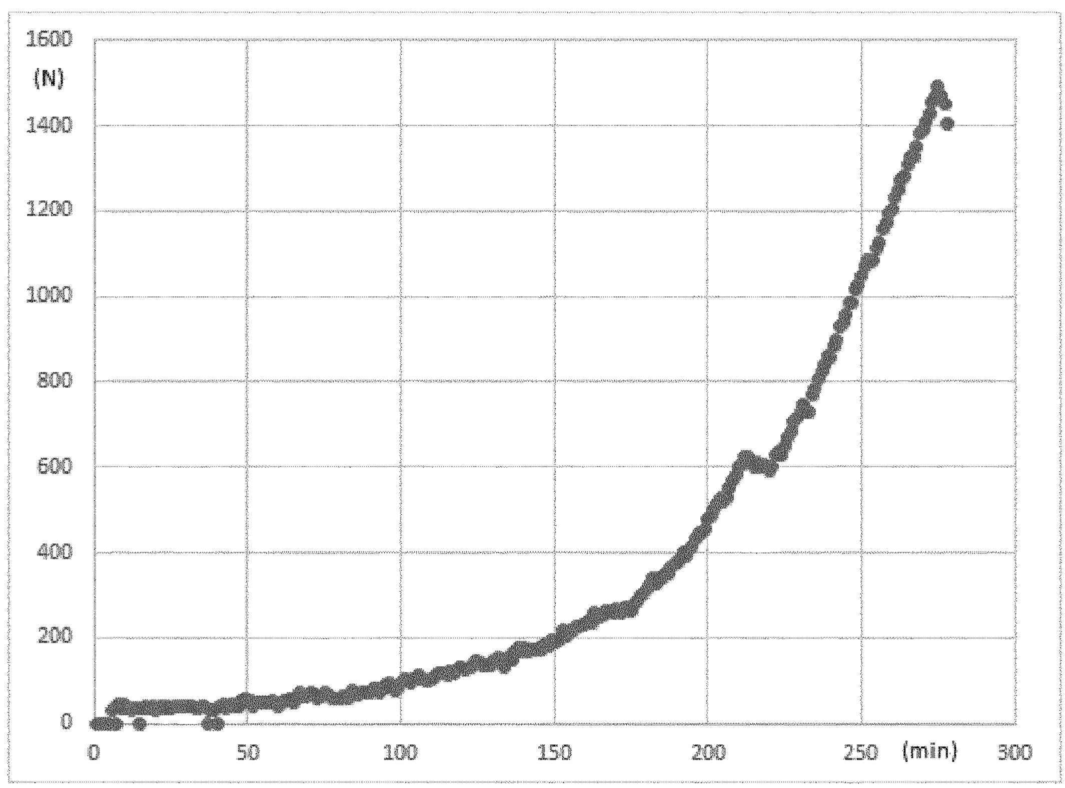
Figure 7B:
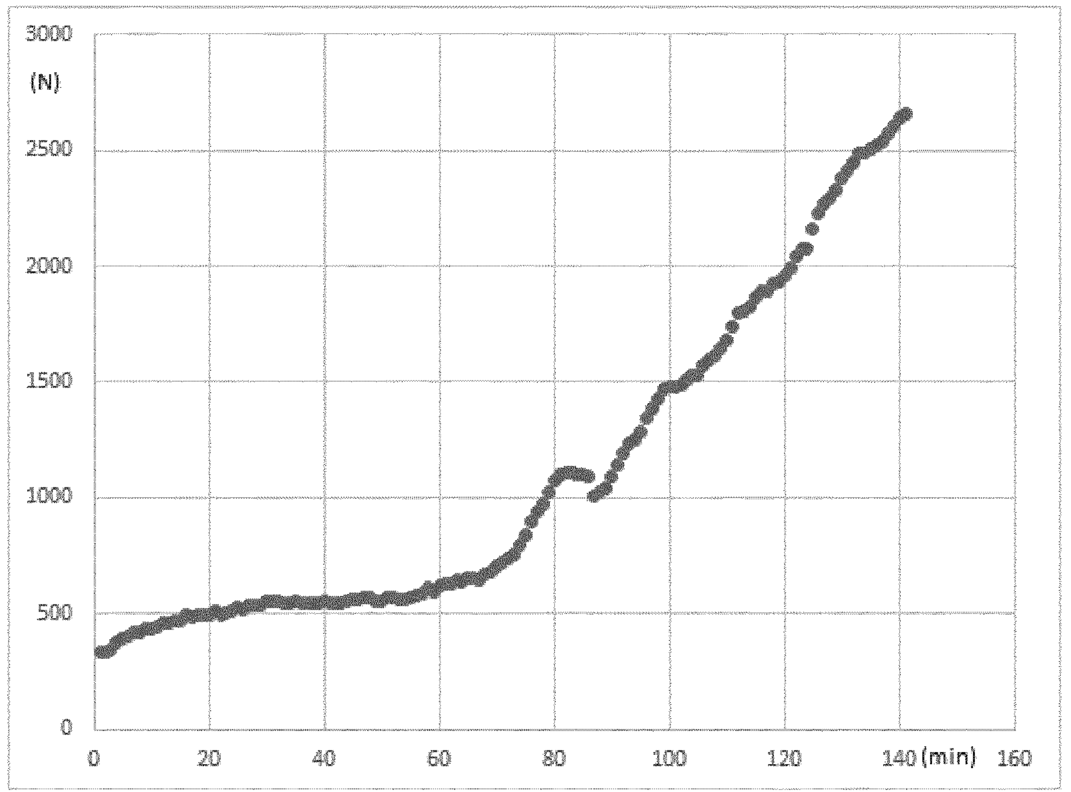

FIGS. 7*a* and 7*b* respectively show the force (N) on the Y-axis applied as a function of time (min) on the X-axis using a 400 μm and 800 μm cross section nozzle. From these figures it can be observed that the force needed to achieve extrusion of a continuous filament increases exponentially as a function of time. As soon as the paste composition was subjected to the force of the plunger of the extruder, phase separation started with water being continuously expelled from the paste and the solids content of the paste increasing with time.

Example 4-5

Paste compositions were prepared using particles of the following desired materials as indicated in table 2 below: stainless steel and copper. Paste compositions were prepared by mixing the desired materials with water or 1-propanol as a solvent, binder material and additive as indicated in table 2. Each time a homogeneous paste was obtained, which did not show phase separation.

Stainless steel was obtained from Carpenter, type Micro Melt 316L size-22 Heat no 45704. Copper metal particles were obtained from Sigma Aldrich and had an average particle size between 14 and 25 μm.

In example 4, methyl cellulose obtained from Across, 4000 cp was used as a binder material. In example 5, hydroxypropyl cellulose obtained from Sigma Aldrich, with a MW of 1000000 was used as a binder material.

In both example 4 and 5, lanolin (Adeps Lanae, Fagron) was used as an additive component.

TABLE 2

| Example | Desired Material | wt. % desired material | Solvent (wt. %) | Binder (wt. %) | Additive (wt. %) |
|---|---|---|---|---|---|
| 4 | Stainless steel | 91 | water 7.5 | 0.3 | 1.2 |
| 5 | Copper | 88.4 | 1-propanol 9.6 | 0.3 | 1.7 |

The paste was extruded and subjected to a fibre deposition process to provide a continuous filament with an average diameter of 400 μm, at an extrusion rate of 250 μl per minute. No phase separation was observed. The force applied to achieve extrusion could be kept constant.

The invention claimed is:

1. A method for producing a three-dimensional shaped article of a material of interest using additive manufacturing, the method including feeding an additive manufacturing paste composition directly to a nozzle and dispensing from said nozzle on a print surface, interconnected filaments of paste composition in a predetermined arrangement in a plurality of consecutive stacked layers to form a green structure, and immediately upon said dispensing, drying the green structure to obtain the three-dimensional shaped article, wherein the filaments of the consecutive layers are connected to one another at least at contact points between filaments of consecutive layers, wherein said paste composition is manufactured by mixing 70-99.8 wt. % with respect to the weight of the composition of particles of the material of interest, the material of interest being one or more compounds selected from the group of metals and metal alloys and mixtures thereof, at least one binder component, at least one additive component, which is a lubricant, one or more solvents which are miscible with each other, wherein the sum of the concentration of the at least one additive component and the at least one binder component is between 0.06 wt. % and 10.0 wt. %, with respect to the weight of the composition, and wherein at least one of the additive component and the binder component or a mixture thereof is shear-thinning.

2. The method according to claim 1, wherein said at least one additive component is a water-dispersible wax, a water dispersible oil or a water dispersible fat, or a mixture of two hereof.

3. The method according to claim 1, wherein said at least one additive component is selected from the group consisting of vegetable and animal waxes, mineral waxes, petrochemical waxes, and chemically modified waxes and synthetic waxes.

4. The method according to claim 1, wherein a remainder of weight % for the paste composition, up to 100 wt. %, is made up by the one or more solvents and conventional additional ingredients of the paste composition.

5. The method according to claim 1, wherein the sum of the concentration of the at least one additive component and the at least one binder is between 0.06 wt. % and 6.0 wt. % with respect to the total weight of the composition.

6. The method according to claim 1, wherein the at least one additive component has a concentration of 0.20 wt. % and 10.0 wt. % with respect to the total weight of the composition.

7. The method according to claim 1, wherein the at least one additive component has a concentration of at most 7.5 wt. % in weight percent dry matter, with reference to the total weight of the paste composition.

8. The method according to claim 1, wherein the particles of said material of interest have a concentration of between 75.0 wt. % and 99.8 wt. % with reference to the total weight of the paste composition.

9. The method according to claim 1, wherein said at least one binder component is selected from the group consisting of plasticizers, hydrocolloids, cellulose derivatives or combinations thereof, polymeric alcohols in particular polyvinyl alcohol, glycols in particular polyethylene glycol or polypropylene glycol, methyl cellulose, ethyl cellulose, polyvinylpyrrolidone and combinations thereof.

10. The method according to claim 1, wherein said at least one binder component is a hydrophilic binder.

11. The method according to claim 1, wherein said at least one binder component has a concentration which is between 1.0 wt. % and 10.0 wt. %, in weight percent dry matter, with reference to the total weight of the paste composition.

12. The method according to claim 1, wherein the at least one binder component has a maximum concentration of at most 7.5 wt. % in weight percent dry matter, with reference to the total weight of the paste composition.

13. The method according to claim 1, wherein the concentration of the material of interest in the paste composition is between 70 wt. % and 99.5 wt. %.

14. The method according to claim 1, wherein the one or more solvents are selected from the group consisting of water, an organic solvent, an ionic liquid or a mixture of two or more hereof.

15. The method according to claim 3, wherein said at least one additive component is lanolin.

16. The method according to claim 7, wherein the at least one additive component has a concentration of at most 0.25 wt. % in weight percent dry matter, with reference to the total weight of the paste composition.

17. The method according to claim 12, wherein the at least one binder component has a maximum concentration of at most 2.5 wt. % in weight percent dry matter, with reference to the total weight of the paste composition.

18. The method according to claim 14, wherein the one or more solvents are selected from the group consisting of deionized water, ethanol, isopropyl alcohol, acetone, or a mixture of two or more thereof.

* * * * *